(No Model.)
A. H. FANCHER.
SHEET METAL CAN.
No. 246,381. Patented Aug. 30, 1881.
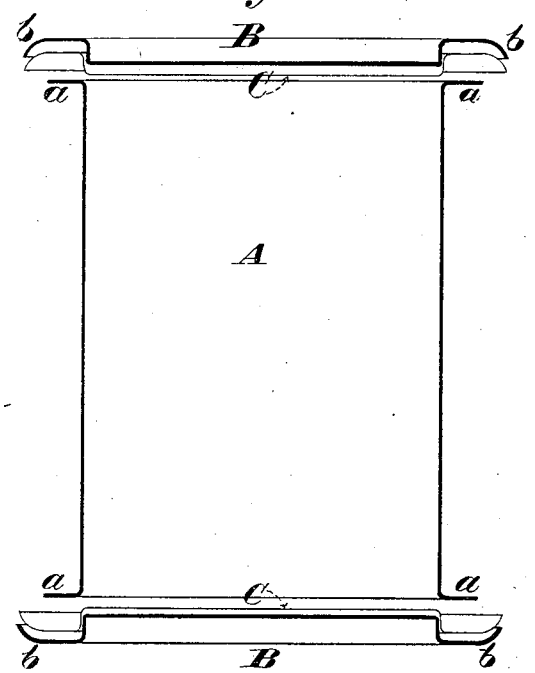
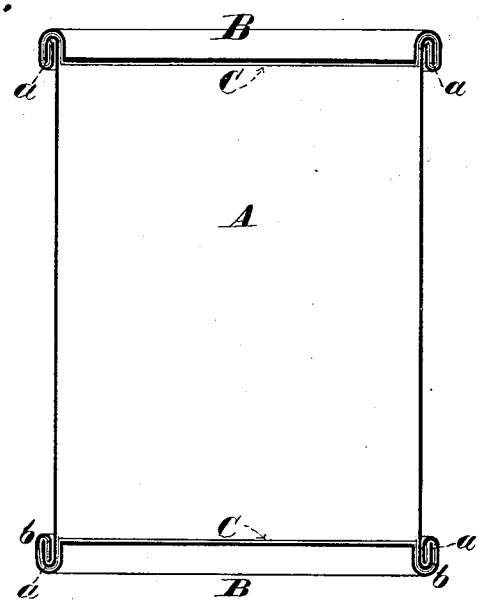
Witnesses.
Thomas E. Crossman
Robt W. Matthews
Inventor
Alton H. Fancher
per James A. Whitney
Att'y.

United States Patent Office.

ALTON H. FANCHER, OF BROOKLYN, NEW YORK, ASSIGNOR OF ONE-HALF TO THEODORE W. BURGER, OF PLAINFIELD, NEW JERSEY.

SHEET-METAL CAN.

SPECIFICATION forming part of Letters Patent No. 246,381, dated August 30, 1881.

Application filed June 25, 1881. (No model.)

*To all whom it may concern:*

Be it known that I, ALTON H. FANCHER, of Brooklyn, in the county of Kings and State of New York, have invented an Improvement in Sheet-Metal Cans, of which the following is a specification.

This invention relates to that class of cans used for holding condensed milk and other articles, which it is necessary or desirable to have practically hermetically sealed against the access of air; and its object is to provide a can for the purpose indicated which may be manufactured at a lower cost than other cans in successful and practical use for like purposes, and which may be filled before closing with greater convenience than those common in the trade.

To this end the invention comprises a can of novel construction, whereby the said object is secured without the use of solder for sealing the joint between the body and heads of the can, which is ordinarily a source of material expense.

Figure 1 is a central longitudinal sectional view of the parts of a sheet-metal can made according to my invention previous to the seaming of the heads to the body. Fig. 2 is a similar sectional view, showing the can in its completed form, the proportions at the seams being somewhat exaggerated, the better to show the relative positions of the parts.

A is the body of the can, having the circumferential outwardly-projecting flange $a$.

B B are the heads, each formed with the circumferential bead $b$ of curved cross-section, as represented in Fig. 1, the beads $b$ bearing such relation to the flange $a$ that when a head, B, is placed upon the adjacent end of the body A the bead will fit upon and over the contiguous flange $a$.

Placed across the inner side of each head B, and extending across the beads $b$, is a disk, C, of paraffine-paper—that is to say, paper impregnated with paraffine-wax—the said disk being cut or formed to a circumferential contour and superficial area, substantially the same as the contour and area of the head B, including the beads $b$ of the latter. When the head B is brought upon the adjacent end of the body A the circumferential portion of the paraffine-paper disk C is compressed and held between the beads $b$ and the flange $a$, while the central or main portion of the said disk is stretched or strained across the inner side of the head, and forms a lining thereto extending across and closing the opening $c$. The parts being brought into the aforesaid relation with each other, the flange $a$ and the beads $b$, with the circumferential portions of the disk C between them, are folded to form the ordinary double seam or joint, as represented in Fig. 2, the circumferential portions of the paraffine-paper disk C being snugly compressed between the flange $a$ and the beads $b$, and thereby forming a tight packing with the double seam to render the same impervious to the passage of air, gases, or moisture, and inasmuch as by thus providing the packing of paraffine-paper by means of the circumferential portion of a disk, as herein described, the displacement of said packing during the process of forming the seam is avoided, the central or strained portion of the disk serving, so to speak, as a brace, maintaining the circumferential portion equidistant from the center of the can, and therefore holding the same coincident with the circumferential portions of the head B and body A, respectively. Furthermore, inasmuch as the disks may be rapidly cut by a die to the exact shape required, and inasmuch as their disk form gives them sufficient stiffness to be handled without losing their shape, it follows that the operation of manufacturing the can is very greatly facilitated as compared with any operation of placing a mere strip of packing material within the joint, as has sometimes been proposed. After the completion of the can, paraffine-paper stretched across the inside of the heads may be left there, and forms a sort of lining to the heads themselves.

I do not claim, broadly, the interposition of a strip of paper or similar material between the parts of a double seam of a sheet-metal can; but What I do claim as my invention is—

The combination of the disk C with the head B and body A of a sheet-metal can, the circumferential edges of the said disk being compressed within the double seam formed by the interlocked flange $a$ of the body and bead $b$ of the head, all substantially as and for the purpose herein set forth.

ALTON H. FANCHER.

Witnesses:
 ROBT. W. MATTHEWS,
 THOMAS E. CROSSMAN.